United States Patent
Bi et al.

(10) Patent No.: US 7,492,739 B2
(45) Date of Patent: Feb. 17, 2009

(54) METHOD FOR ENHANCING THE COMMUNICATION CAPABILITY IN A WIRELESS TELECOMMUNICATION SYSTEM

(75) Inventors: Hao Bi, Lake Zurich, IL (US); Michael D. Kotzin, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 561 days.

(21) Appl. No.: 11/399,269

(22) Filed: Apr. 5, 2006

(65) Prior Publication Data
US 2007/0237094 A1 Oct. 11, 2007

(51) Int. Cl.
*H04W 4/00* (2006.01)
(52) U.S. Cl. .................... 370/331; 370/468; 455/436
(58) Field of Classification Search ............. None
See application file for complete search history.

(56) References Cited

U.S. PATENT DOCUMENTS

| | | | |
|---|---|---|---|
| 2005/0009524 A1 | 1/2005 | Garani et al. | |
| 2006/0039327 A1* | 2/2006 | Samuel et al. | 370/331 |
| 2006/0268782 A1* | 11/2006 | Kwak et al. | 370/331 |
| 2006/0276189 A1* | 12/2006 | Kiernan et al. | 455/436 |
| 2007/0076664 A1* | 4/2007 | An et al. | 370/331 |
| 2007/0230401 A1* | 10/2007 | Rayzman et al. | 370/331 |

* cited by examiner

*Primary Examiner*—Bob A Phunkulh

(57) ABSTRACT

A method (400) for establishing a first communication link between a communications network (105) and a network node (115) in accordance with a first wireless communications protocol. The method also can include evaluating a signal parameter for a signal transmitted between a station (110) and the network node. In response to the channel quality exceeding a threshold, the station can be signaled to establish a second communication link with the network node in accordance with a second wireless communications protocol. The network node can bridge communications between the station and the communications network.

20 Claims, 4 Drawing Sheets

METHOD FOR ENHANCING THE COMMUNICATION CAPABILITY IN A WIRELESS TELECOMMUNICATION SYSTEM

BACKGROUND OF THE INVENTION

1. Field of the Invention

The present invention generally relates to wireless communication systems and, more particularly, to wireless repeaters.

2. Background of the Invention

With the advent of cellular communications and the Internet, the use of wireless communications bandwidth has seen explosive growth in recent years. Indeed, wirelessly networked computers have become commonplace throughout much of the world and mobile telephones now are used to browse the Internet and download relatively large multimedia files. In consequence, there is a continual need to expand network infrastructure to support the modern appetite for wireless communications.

Unfortunately, the deployment and maintenance of network infrastructure components is relatively expensive. Moreover, many communities have placed restrictions on the construction of new communication towers. Accordingly, there remains a need to improve wireless network efficiency and to maximize use of infrastructure components.

SUMMARY OF THE INVENTION

The present invention relates to a method for dynamically configuring a wireless communication system. The method can include establishing a first communication link between a communications network and a network node in accordance with a first wireless communications protocol. The method also can include evaluating at least one signal parameter for a signal transmitted between a station and the network node. In response to the signal parameter exceeding a threshold, the station can be signaled to establish a second communication link with the network node in accordance with a second wireless communications protocol. The network node can bridge communications between the station and the communications network.

The present invention also relates to a network node that includes a transceiver which communicates in accordance with a first communications protocol and at least a second communications protocol. The network node also can include a processor that selectively executes a repeater service application, receives data received by the transceiver in accordance with the first communications protocol, and processes the data for transmission by the transceiver in accordance with the second communications protocol. The network node can be a station or an access point.

Another embodiment of the present invention can include a machine readable storage being programmed to cause a machine to perform the various steps described herein.

BRIEF DESCRIPTION OF THE DRAWINGS

Embodiments of the present invention will be described below in more detail, with reference to the accompanying drawings, in which.

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The present invention relates to a method and a system for dynamically sharing with a station network bandwidth that is presently allocated to another network node. For example, a station communicating with a wireless metropolitan area network (WMAN) in accordance with the IEEE 802.16 protocol can establish an IEEE 802.11 communication link with a network node that also is presently communicating with the WMAN over an IEEE 802.16 communications link. The station then can terminate its 802.16 communication link and communicate with the communications network using the network node as a repeater or relay. In that regard, the network node can bridge communications between the station and the network. By reducing the total number of 802.16 communication links, such sharing of network bandwidth can improve efficiency of the IEEE 802.16 network.

Figure 1:
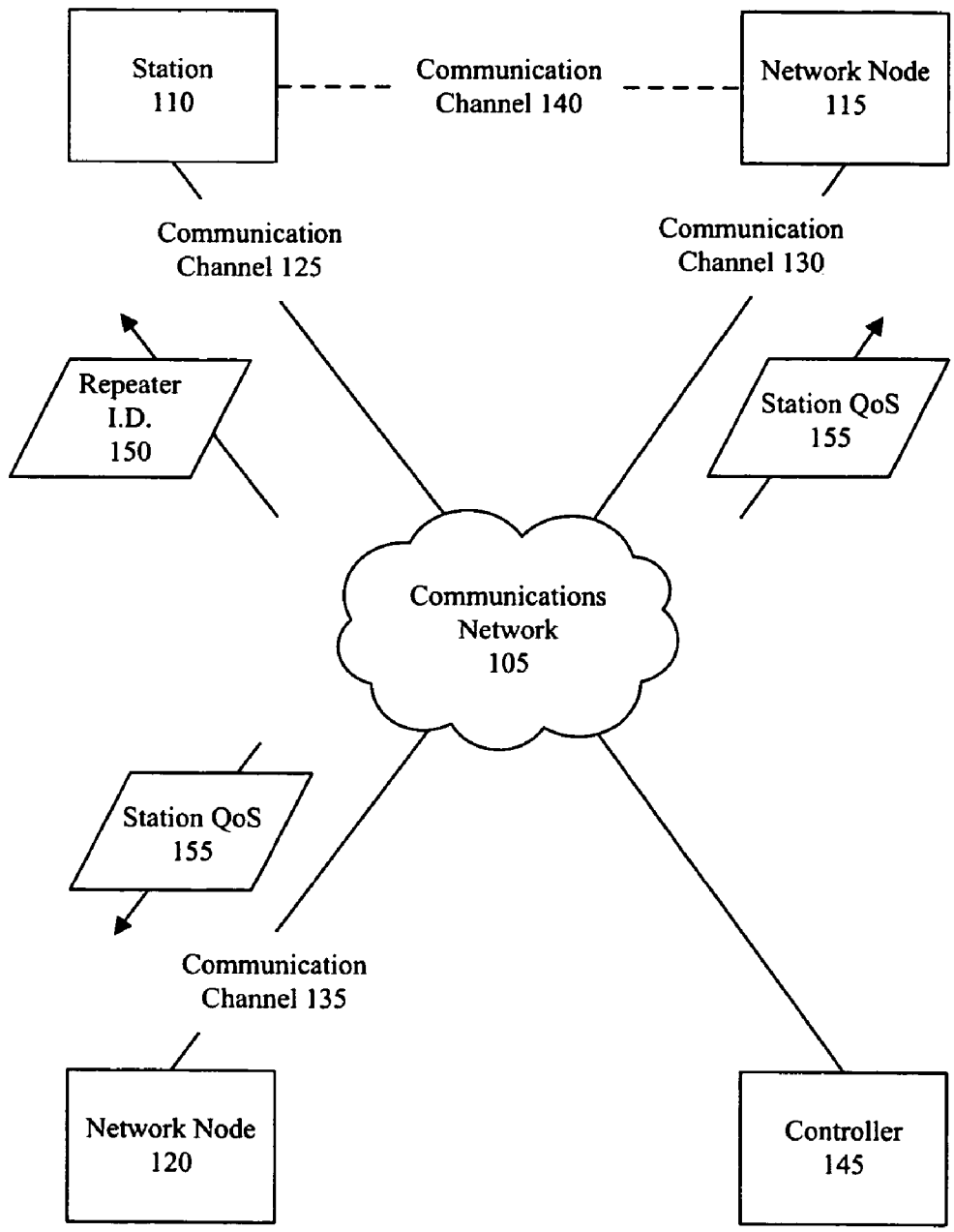
FIG. 1 depicts a communication system that is useful for understanding embodiments of the present invention.

FIG. 1 depicts a communication system 100 that is useful for understanding the present invention. The communication system 100 can include a station 110 and one or more network nodes 115, 120. The network nodes 115, 120 may be stations or any of a variety of devices that comprise one or more multimode transceivers, such as access points. A station may be, for example, a computer, a mobile computer, a personal digital assistant, a mobile telephone, or any other wireless communication device having a user interface.

The station 110 and network nodes 115, 120 each can communicate with a communications network 105 over a respective wireless communication channel 125, 130, 135 using a first communications protocol. For example, the communications network 105 can include a plurality of network devices (or systems) such as base transceiver stations, repeaters, access points and/or any other network devices with which the station and/or the network nodes 115, 120 can establish communication links. In that regard, the communication channels 125, 130, 135 each can be established using different network devices in the communications network 105, or two or more of the communication channels 125, 130, 135 can be established using a same network device.

The first communications protocol can include any of the IEEE 802 wireless network protocols (e.g. 802.11a/b/g/i, 802.15, 802.16, 802.20), a Global System for Mobile Communication (GSM) protocol, frequency division multiple access (FDMA), time division multiple access (TDMA), code division multiple access (CDMA), wideband code division multiple access (WCDMA), orthogonal frequency division multiple access (OFDMA), or any other wireless communications protocol implemented by a communications network 105.

The station 110 and the network nodes 115, 120 also can support a second communications protocol that is different than the first communications protocol. The second communications protocol can include any of the IEEE 802 wireless network protocols, a GSM protocol, FDMA, TDMA, CDMA, WCDMA, OFDMA, or any other wireless communications protocol implemented to support communications between the station 110 and one or more of the network nodes 115, 120. Regardless of whether the station 110 and the network nodes 115, 120 communicate using the first communications protocol or the second communications protocol, such communications can be consistent with a desired messaging protocol, for example Internet protocol (IP).

The second communications protocol can be used by the station 110 to connect to the network node 115 (and/or the network node 120) over a communication channel 140 and use such network node 115 as a repeater to communicate with the communications network 105. As such, the network node 115 can translate between the first and second communications protocols and bridge the communication channel 140 and the communication channel 130. For example, the network node 115 can receive data from the station 110 in accordance with the 802.11 protocol and transmit the data to the communications network 105 in accordance with the 802.16 protocol. Similarly, the network node 115 can receive data from the communications network 105 in accordance with the 802.16 protocol and transmit the data to the station 110 in accordance with the 802.11 protocol.

Each of the network nodes 115, 120 can dynamically or manually initiate a repeater service. For example, the network node 115 can be configured to activate the repeater service if the network node is idle for a certain period of time or if resources (e.g. processing resources, radio resources or networking resources) on the network node 115 are lightly loaded. The network nodes 115, 120 also can reach agreement with the communications network 105 to activate the repeater function. For example, the network node 115 can send a message to a communications network controller 145 requesting to be identified as a repeater provider. The message can be sent in response to a user input or automatically sent. The controller 145 can respond with an acknowledgement that activation of the repeater service is either acceptable or not acceptable.

The availability of the network nodes 115, 120 for use as repeaters can be communicated to the station 110 in any suitable manner. For example, in one arrangement the network nodes 115, 120 can communicate signals detectable by the station 110 that advertise the availability of the network nodes 115, 120 to be used as repeaters. Such signals can be, for instance, transmitted in accordance with the second communications protocol In another arrangement, the controller 145 can monitor communications activity over the communications network 105. In response to the station 110 moving into, or being activated in, an area proximate to one or more network nodes 115, 120, using the first network protocol the controller can send a repeater identifier 150 to the station 110. The repeater identifier 150 can identify the network nodes 115, 120 that are available for use as repeaters by the station 110.

The controller 145 can determine the location of the station 110 in any suitable manner. For example, if the station 110 establishes a communication link with a particular access point, the controller 145 can determine that the station 110 is in a geographic region serviced by the access point. In another arrangement, the station 110 can include a global positioning system (GPS) receiver and the station's GPS coordinates can be provided to the controller 145. Still, the location of the station 110 can be determined using other methods and the invention is not limited in this regard.

After communicating with the communications network 105 over the communication channel 125 using the first communications protocol (e.g. IEEE 802.16), the station 110 can handoff to the network node 115 and initiate communications over the communication channel 140 using the second communications protocol (e.g. IEEE 802.11). To facilitate a fast handoff of the station 110 to the network node 115, the controller 145 can provide the station's quality of service (QoS) information 155 to one or more of the network nodes 115, 120 that are proximate to the station 110 and capable of acting as repeaters for the station 110.

In another arrangement, the controller 145 can monitor signal parameters, for instance signal strength and/or quality of transmissions, communicated by the network nodes 115, 120 over the respective communication channels 130, 135. Based on the signal parameters, the controller 145 can select a network node 115, 120 to which to communicate the QoS information 155. For example, the network node 115, 120 that is selected can be the network node that is transmitting highest signal strength and/or best signal quality. Still, the network node 115, 120 that is selected to be available as a repeater can be selected in any other suitable manner and the invention is not limited in this regard.

The QoS information 155 can include the station's required signal strength, transmission rate, bit error rate, packet rate, packet latency and/or any other information relevant to the station's desired communication characteristics. The controller 145 also can alert the network nodes 115, 120 to search for the station 110. The sending of the QoS information 155 can qualify as such an alert, or another message can be communicated. The station's QoS information 155 can be transmitted to the network nodes 115, 120 in any suitable manner. For example, the controller 145 can cause the QoS information 155 to be broadcasted to the network nodes 115, 120 using a single frequency network (SFN) technique.

The station 110 can handoff to the network node 115 or network node 120 at the behest of the controller 145, in response to a user input, or in response to a dynamic decision process. For example, channel quality between the station 110 and the network node 115 can be measured and the station 110 can handoff to the network node 115 in response to the channel quality reaching a threshold value. The channel quality can include parameters such as signal strength, transmission rate, bit error rate, or any other suitable parameters. In one arrangement, the channel quality can be measured by the station 110 and the station 110 can initiate the handoff. In another arrangement, the channel quality can be measured by the controller 145 and the controller 145 can initiate the handoff. In yet another arrangement, the handoff can be provided as a user selectable option on the station 110.

Figure 2:
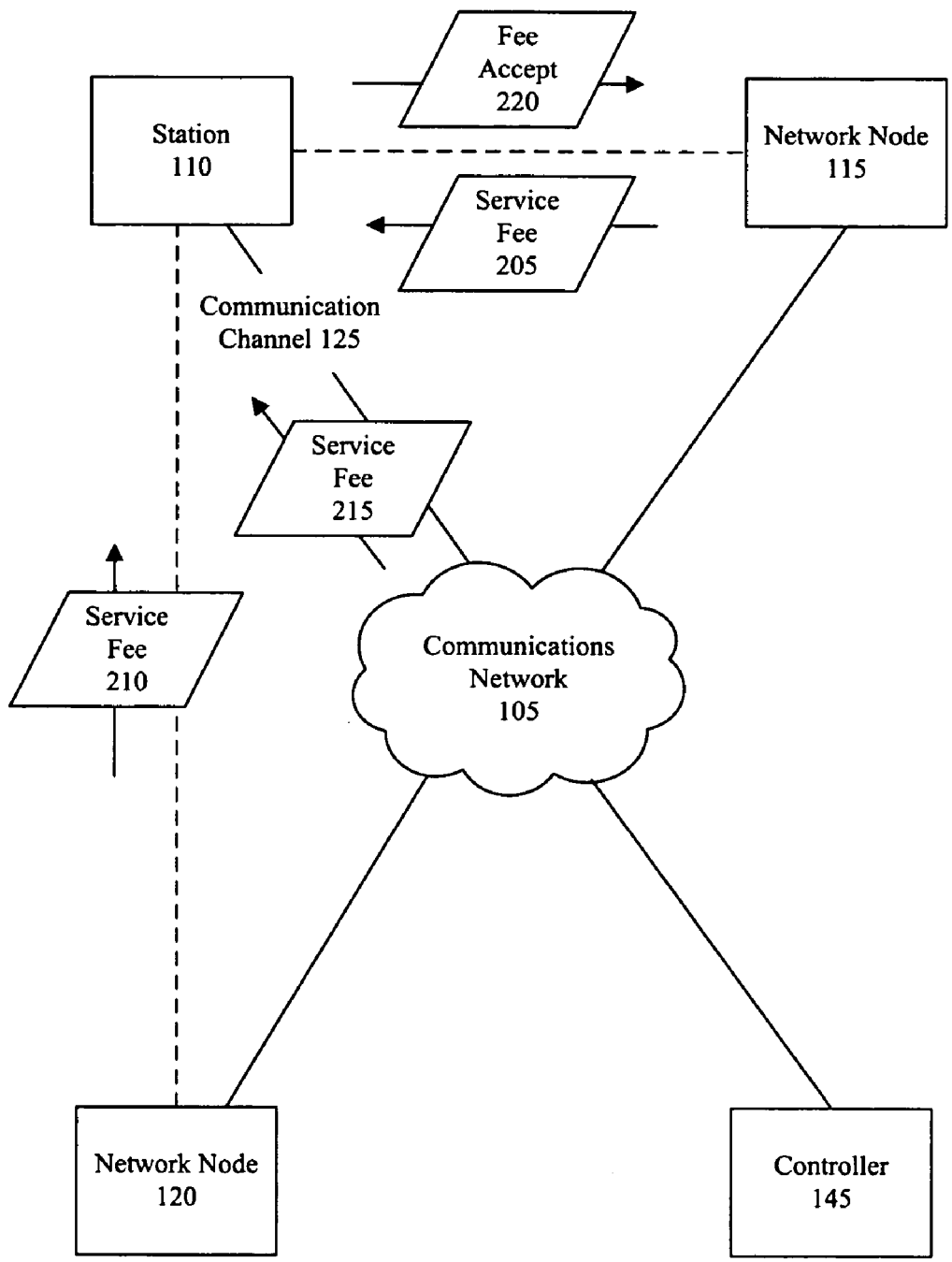
FIG. 2 depicts another aspect of the communication system of FIG. 1 that is useful for understanding embodiments of the present invention.

FIG. 2 depicts another aspect of the communication system 100 that is useful for understanding the present invention. Use of the network nodes 115, 120 as repeaters can be a revenue generating process. For example, each of the network nodes 115, 120 can charge a service fee for use of network services which they provide, for instance use of the network nodes 115, 120 as repeaters to connect to the communications network 105. The service fees can be tracked by the communications network 105, for instance using the controller 145. The service fees can be previously agreed upon, or each of the network nodes 115, 120 can communicate to the station 110 a respective service fee 205, 210 that is required to utilize its repeater services. In addition, the communications network 105 can communicate a service fee 215 for use of network services provided by the communications network 105, for instance to allow the station 110 to establish a direct connection with the communications network 105 over the communications channel 125.

The service fee amounts can be dynamically selected. For example, the service fee 205 charged by the network node 115 can increase as the network node 115 becomes more heavily loaded and decrease as load traffic subsides. Similarly, the service fee 215 charged by the communications network 105 can increase as the communications network 105 becomes more heavily loaded and decrease as the traffic decreases.

The various service fees 205-215 can be evaluated to select a communications option. For example, the station 110 can automatically select whether to establish a connection to the communications network 105 directly over the communications channel 125 or to use one of the network nodes 115, 120 as a repeater based on a selection algorithm. The selection algorithm can, for instance, select the least expensive communication option. In another aspect of the invention, the various communication options and their pricing can be presented to a user of the station 110 via a user interface, and the user can be prompted to enter a user selection to select one of the options.

Once the station 110 has selected to connect to the communications network 105 via a particular network node 115 or to connect directly to the communications network 105, a fee acceptance 220 can be transmitted. For example, if it is decided that the station 110 is to connect to the communications network 105 via the network node 115, the fee acceptance 220 can be transmitted to the network node 115. In response, the network node 115 can establish a communications link with the station 110. In an alternate arrangement, all fee acceptances can be transmitted to the controller 145, and the controller 145 can signal the network node 115 and/or the station 110 to establish the communications link. Nonetheless, the invention is not so limited and fee processing can be handled in any other suitable manner.

All of the service fees collected for a particular network node 115 can be distributed to the operator of the network node 115, or only a portion of the service fees can be distributed. In one arrangement, the service fees can be distributed as credits to an account of an operator of the network node. Still, there are a myriad of service fee distribution methods that can be implemented and the invention is not limited in this regard.

Figure 3:
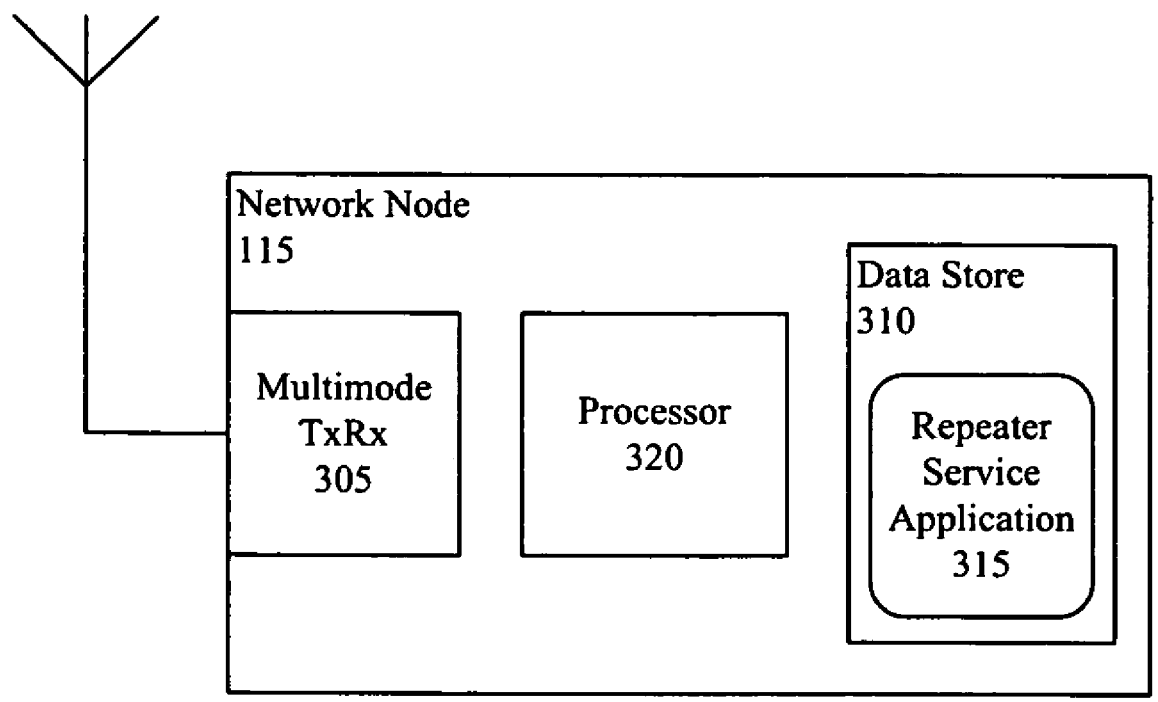
FIG. 3 depicts a network node that is useful for understanding embodiments of the present invention.

FIG. 3 depicts an example of the network node 115 that is useful for understanding the present invention. The network node 115 can comprise a multimode transceiver (hereinafter "transceiver") 305, a data store 310 upon which a repeater service application 315 is stored, and a processor 320. The transceiver 305 can communicate in accordance with the first communications protocol and in accordance with the second communications protocol. For example, the transceiver 305 can communicate via both IEEE 802.16 and IEEE 802.11. In an alternate arrangement, a first transceiver can be provided for communicating in accordance with the first communications protocol and a second transceiver can be provided for communicating in accordance with the second communications protocol.

To implement repeater functionality on the network node 115, the processor 320 can execute the repeater service application 315. The repeater service application 315 can be executed in response to a request from the station, a request from the controller, inactivity on the network node 115, light loading on the network node 115, a user input, or any other condition suitable for triggering the repeater service application 315 to execute.

The processor 320 also can process data received via the transceiver 305 and data to be transmitted via the transceiver 305. For example, the processor 320 can receive data that was received by the transceiver 305 in accordance with the first communications protocol, and process the data for transmission by the transceiver 305 in accordance with the second communications protocol. Similarly, the processor 320 can receive data that was received by the transceiver 305 in accordance with the second communications protocol, and process the data for transmission by the transceiver 305 in accordance with the first communications protocol. In one arrangement, the processor 320 can define the communications protocols with which the transceiver 305 communicates. In another arrangement, the communications protocols can be defined by the transceiver 305.

Figure 4:
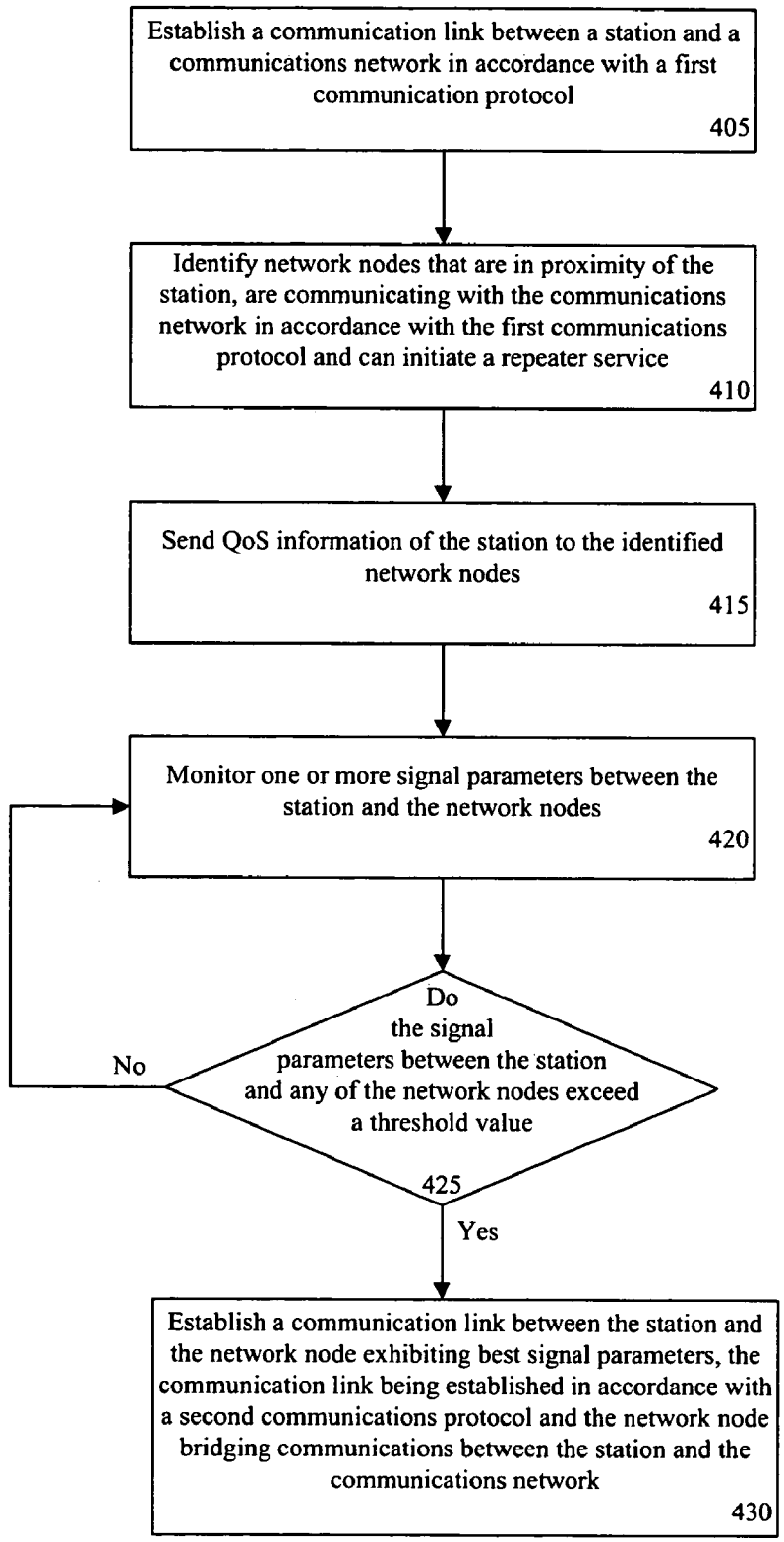
FIG. 4 is flowchart that is useful for understanding embodiments of the present invention.

FIG. 4 is flowchart presenting a method 400 that is useful for understanding the present invention. At step 405, a communication link can be established between a station and a communications network in accordance with a first communications protocol. At step 410, network nodes, for instance access points and/or other stations, can be identified. The identified network nodes can be those that are in proximity of the station, are communicating with the communications network in accordance with the first communications protocol and can initiate a repeater service.

Proceeding to step 415, QoS information for the station can be transmitted to the identified network nodes. At step 420, one or more signal parameters between the station and the network nodes can be monitored. Referring to decision box 425, if the signal parameters between the station and any of the network nodes exceed a threshold value, the process can continue to step 430 where a communication link is established between the station and a selected network node. The network node that is selected can be the network node exhibiting the best signal parameters when communicating with the station. For example, decision metrics for selecting the network node can be based on signal strength, channel quality (e.g. bit error rate), available bandwidth, available transmission rates and/or any other suitable parameter that may be evaluated. Further, the decision metrics also can be based on the cost of using the communication channels. The communication link can be established in accordance with a second communications protocol. The network node then can bridge communications between the station and the communications network.

The present invention can be realized in hardware, software, or a combination of hardware and software. The present invention can be realized in a centralized fashion in one processing system or in a distributed fashion where different elements are spread across several interconnected processing systems. For example, one or more of the methods discussed herein can be implemented on the station, the network nodes, the controller and/or any other device operatively connected to the communications network. Any kind of processing system or other apparatus adapted for carrying out the methods described herein is suited. A typical combination of hardware and software can be a processing system with an application that, when being loaded and executed, controls the processing system such that it carries out the methods described herein. The present invention also can be embedded in an application product, which comprises all the features enabling the implementation of the methods described herein, and which when loaded in a processing system is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a subroutine, a function, a procedure, an object method, an object implementation, an executable application, an applet, a servlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. As used herein, the word "can" is to be interpreted as an alternate for the word "may." Thus, "can include" and "can be," for example, are to be interpreted as "may include" and "may be," respectively. The terms "including" and/or "having," as used herein, are defined as comprising (i.e., open language). The term "coupled," as used herein, is defined as connected, although not necessarily directly, and not necessarily mechanically, i.e. communicatively linked through a communication channel or pathway.

This invention can be embodied in other forms without departing from the spirit or essential attributes thereof. Accordingly, reference should be made to the following claims, rather than to the foregoing specification, as indicating the scope of the invention.

What is claimed is:

1. A method for dynamically configuring a wireless communication system comprising:
   establishing a first communication link between a communications network and a network node in accordance with a first wireless communications protocol;
   evaluating at least one signal parameter for a signal transmitted between a station and the network node; and
   responsive to the signal parameter exceeding a threshold, signaling the station to establish a second communication link with the network node in accordance with a second wireless communications protocol, the network node bridging communications between the station and the communications network.

2. The method according to claim 1, wherein establishing the first communication link between the communications network and the network node comprises establishing the first communication link between the communications network and a second station.

3. The method according to claim 1, wherein establishing the first communication link between the communications network and the network node comprises establishing the first communication link between the communications network and an access point.

4. The method according to claim 1, wherein determining channel quality between the station and the network node comprises receiving at least one signal parameter selected from the group consisting of a signal strength, a transmission rate and a bit error rate.

5. The method according to claim 1, further comprising communicating to the station a repeater identifier that identifies network nodes that are available for use as repeaters.

6. The method according to claim 1, further comprising:
   communicating to the station a service fee required for use of networking services; and
   receiving from the station an indicator that indicates agreement to the service fee.

7. The method according to claim 1, further comprising communicating to the network node quality of service (QoS) information for a station communicating over the communications network.

8. A network node comprising:
   a transceiver that communicates in accordance with a first communications protocol and at least a second communications protocol; and
   a processor that selectively executes a repeater service application, receives data received by the transceiver in accordance with the first communications protocol, and processes the data for transmission by the transceiver in accordance with the second communications protocol;
   wherein the repeater service application is selectively executed in response to at least one of a request from a station, a request from a controller, inactivity on the network node, light loading on the network node, and a user input.

9. The network node of claim 8, wherein the network node comprises at least one of a station and an access point.

10. The network node of claim 8, wherein the transceiver is a multimode transceiver.

11. The network node of claim 8, wherein the network node communicates to a station a service fee for use of network services provided by the network node.

12. The network node of claim 11, wherein the network services comprise repeater services.

13. The network node of claim 11, wherein the network node establishes a communications link with the station in response to receiving a fee acceptance.

14. The network node of claim 11, wherein the network node receives QoS information for a station communicating over the communications network that is to be handed off to the network node.

15. A machine readable storage having stored thereon a computer program having a plurality of code sections comprising:
   code for establishing a first communication link between a communications network and a network node in accordance with a first wireless communications protocol;
   code for determining channel quality between a station and the network node; and
   code for, responsive to the channel quality exceeding a threshold, signaling the station to establish a second communication link with the network node in accordance with a second wireless communications protocol, the network node bridging communications between the station and the communications network.

16. The machine readable storage of claim 15, wherein the code for establishing the first communication link between the communications network and the network node further comprises code for establishing the first communication link between the communications network and a second station.

17. The machine readable storage of claim 15, wherein the code for establishing the first communication link between the communications network and the network node further comprises code for establishing the first communication link between the communications network and an access point.

18. The machine readable storage of claim 15, wherein the code for determining channel quality between the station and the network node further comprises code for receiving at least one signal parameter selected from the group consisting of a signal strength, a transmission rate and a bit error rate.

19. The machine readable storage of claim 15, further comprising code for communicating to the station a repeater identifier that identifies network nodes that are available for use as repeaters.

20. The machine readable storage of claim 15, further comprising:
   code for communicating to the station a service fee required for use of networking services; and
   code for receiving from the station an indicator that indicates agreement to the service fee.

* * * * *

UNITED STATES PATENT AND TRADEMARK OFFICE
CERTIFICATE OF CORRECTION

PATENT NO. : 7,492,739 B2  Page 1 of 1
APPLICATION NO. : 11/399269
DATED : February 17, 2009
INVENTOR(S) : Bi et al.

It is certified that error appears in the above-identified patent and that said Letters Patent is hereby corrected as shown below:

Title page, Item (54)
Title reads "METHOD FOR ENHANCING THE COMMUNICATION CAPABILITY IN A WIRELESS TELECOMMUNICATION SSYTEM" and should read
-- REPEATER FOR MULTIPLE RADIO ACCESS --

Signed and Sealed this

Twenty-ninth Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,492,739 B2  Page 1 of 1
APPLICATION NO. : 11/399269
DATED : February 17, 2009
INVENTOR(S) : Bi et al.

It is certified that error appears in the above-identified patent and that said Letters Patent is hereby corrected as shown below:

Title page, Item (54) and at Column 1, lines 1-4
Title reads "METHOD FOR ENHANCING THE COMMUNICATION CAPABILITY IN A WIRELESS TELECOMMUNICATION SSYTEM" and should read
-- REPEATER FOR MULTIPLE RADIO ACCESS --

This certificate supersedes the Certificate of Correction issued December 29, 2009.

Signed and Sealed this

Nineteenth Day of January, 2010

David J. Kappos
*Director of the United States Patent and Trademark Office*